United States Patent

[11] 3,612,040

| [72] | Inventors | Yoshihiko Sugiyama<br>Tokyo;<br>Kaoru Imaoka, Tokyo; Genzo Tanabe,<br>Kobe, all of Japan |
|---|---|---|
| [21] | Appl. No. | 806,563 |
| [22] | Filed | Mar. 12, 1969 |
| [45] | Patented | Oct. 12, 1971 |
| [73] | Assignee | Nihon Kohden Kogyo, Ltd.<br>Tokyo, Japan |
| [32] | Priority | Mar. 16, 1968 |
| [33] | | Japan |
| [31] | | 43/17148 |

[54] METHOD AND APPARATUS FOR MEASURING RESPIRATION RESISTANCE
4 Claims, 5 Drawing Figs.

| [52] | U.S. Cl. | 128/2.08 |
|---|---|---|
| [51] | Int. Cl. | A61b 5/08 |
| [50] | Field of Search | 128/2.08, 2.07, 2; 73/67.1, 67.2; 179/1 F, 1 FN |

[56] References Cited
UNITED STATES PATENTS

| 3,047,661 | 7/1962 | Winker | 179/1 |
|---|---|---|---|
| 3,410,264 | 11/1968 | Frederik | 128/2 |

FOREIGN PATENTS

| 283,405 | 5/1968 | Australia | 179/1 |
|---|---|---|---|
| 850,750 | 10/1960 | Great Britain | 128/2.08 |
| 199,328 | 12/1967 | U.S.S.R. | 128/2.08 |
| 185,436 | 1/1967 | U.S.S.R. | 128/2.08 |

Primary Examiner—Richard A. Gaudet
Assistant Examiner—Kyle L. Howell
Attorney—Chittick, Pfund, Birch, Samuels & Gauthier ABSTRACT: A method and apparatus for measuring respiration resistance comprises a source of fluid pressure for operating a lung-chest system, means for operating the source of fluid pressure, and means responsive to the flow speed and the pressure of the fluid flowing through the lung-chest system for displaying the respiration resistance thereof, there is provided means for detecting variations in the pressure of the source of fluid pressure to provide a negative feedback to the means for operating the source of fluid pressure.

INVENTORS
YOSHIHIKO SUGIYAMA
KAORU IMAOKA
GENZO TANABE

METHOD AND APPARATUS FOR MEASURING RESPIRATION RESISTANCE

BACKGROUND OF THE INVENTION

This invention relates to improvements of a viscosity-resistance-measuring device for lung-chest systems by the oscillation method, and more particularly to an improved respiration resistance meter which is not affected by the aspiration and inspiration pressures as well as the flow speed of air flowing through the lung-chest systems.

First, a method of measuring the viscosity resistance of lung chest systems by the oscillation method is described.

One of the functions of lungs is to perform respiration motions of the chest system to supply fresh air to the cells of the lungs. The physics of these respiration motions involves the ventilation dynamics which is based on the respiration motions of the lung-chest systems which are performed according to a law of physics.

As can be concluded from the dynamic consideration of the physiological structure it may be considered that a lung-chest system comprises the following three elements, viz an elastic element representing the extent of expansion of the lung, a viscosity element manifesting resistance against air flow and an inertial element or mass.

When simulated with an electrical system, the elastic element, normally termed a compliance element, is equivalent to an electric capacitance, and the viscosity resistance element and the inertial elements are equivalent to a resistance and inductance respectively.

If it is now assumed that a lung-chest system is comprised of an oscillation system of one degree of freedom, the lung-chest system may be represented by an equivalent electric circuit as shown in FIG. 1 so that by measuring the value of $R$ in this circuit the viscosity resistance of the lung-chest system can be determined.

Let us consider a method of measuring the value of resistance $R$ of the circuit shown in FIG. 1 by observing the resonance phenomena thereof.

When a current
$$I = I_o \sin wt \quad (1)$$
is passed through the circuit shown in FIG. 1, the voltage $E$ of the system can be expressed by an equation
$$E = E_o \sin w(t+\Phi) \quad (2)$$
where
$$E_o = \sqrt{R^2 + \left(wL - \frac{1}{wc}\right)^2} \cdot I_o \quad (3)$$

$$\phi = \tan^{-1} \frac{wL - \frac{1}{wc}}{R} \quad (4)$$

and $\Phi$ represents the phase angle between $E$ and $I$

When the circuit is at a resonance state, or when
$$wL = \frac{1}{wc} \quad \left(\text{frequency } f = \frac{1}{2\pi\sqrt{LC}}\right)$$

the phase difference between $E$ and $I$ disappears and the resistance becomes independent of the capacitance and inductance. Under the resonance state, equation (3) becomes as follows:

$$E_o = \sqrt{R^2 + \left(wL - \frac{1}{wC}\right)^2} \cdot I_o = \sqrt{R^2} \cdot I_o = R \cdot I_o \quad (5)$$

$$E = E0 \sin(wt+\Phi) = RIo \sin wt \quad (6)$$

Thus, the value of resistance can be determined by the ratio between voltage and current.

Actually, however, $E$ and $I$ are selected to exhibit a Lissajous's figure which assumes a straight line under a resonance state and the value of resistance is determined from the slope of the straight line.

The basic concept of this method of measurement is that an oscillation system is caused to oscillate at the resonance state by applying some external force to the system so as to separate the resistance component (the viscosity resistance) from the capacitive component (elastic resistance) and the inductive component (inertial mass).

Based upon this basic consideration, various methods of measuring the viscosity resistance of the lung-chest system may be derived.

As a typical example, FIG. 2 shows a method employing a loudspeaker. As shown, an electric signal generated by an oscillator 1 is amplified by an amplifier 2 to drive a loudspeaker 3. The motion of the loudspeaker comprises a source of fluid (or a source of pressure) for causing an oscillation system comprised of a lung-chest system to oscillate. A fluid flow created by this source corresponds to a current in an electric circuit, while pressure $P$ in this fluid circuit corresponds to voltage $E$ in the electric circuit and is applied to the Y axis of an oscilloscope via an amplifier 6. Flow speed $V$ of the fluid corresponding to current $I$ is supplied to the X axis of the oscilloscope through an amplifier 7.

While resistance $R$ of the electric circuit may be measured by using the apparatus described above, in the actual practice the following method is preferred.

More particularly, the movement of the diaphragm of the loudspeaker is utilized to operate the lung-chest system and the frequency of oscillator 1 is adjusted such that the Lissajous's figure of the pressure and flow speed in the fluid circuit may become straight lines. When straight lines are obtained the slope thereof is measured to determine the viscosity resistance of the lung-chest system.

The Lissajous's figure actually displayed by an oscilloscope under resonance state is shown by FIG. 3. The reason why the Lissajous's figure does not take the form of a single straight line is that the aspiration pressure, the inspiration pressure and the respiration flow speed are superimposed upon the pressure and flow speed created by the loudspeaker for oscillating the lung-chest system. Generally, the movement toward the second quadrant represents the aspiration phase whereas that toward the fourth quadrant the inspiration phase. Lengths $a$, $b$ and $c$ represent the variable components in the pressure and flow speed of fluid or air created by the motion of the loudspeaker. Since these components function to actually operate the lung-chest system, slopes of these straight lines indicate the viscosity of the system. Thus, the viscosity resistance $R1$ for the maximum aspiration fluid speed is given by $\tan \theta 1$, while the viscosity resistance $R2$ for the maximum inspiration fluid speed is given by $\tan \theta 2$.

Measurement of the viscosity resistance of the lung-chest system at the maximum speed of aspiration and inspiration is important for clinics. However, as can be clearly noted from FIG. 3, since the length if straight portions of the Lissajous's figure is short at the maximum speed of the aspiration and inspiration, measurement of their inclination by means of a cursor, for example, is extremely difficult, thus rendering inaccurate the result of measurement Especially, at the maximum speed of aspiration and inspiration the amplitude of vibration of the diaphragm of the loudspeaker decreases as the pressure of the aspiration and inspiration increases whereby it becomes impossible to oscillate the lung-chest system at a constant airflow.

The reason for these phenomena is that, the cone-shaped diaphragm of paper of the loudspeaker is greatly displaced by the pressure of aspiration and inspiration to brings its driving coil out of the magnetic field thus greatly decreasing the driving power of the speaker for a given electrical signal input from the oscillator.

SUMMARY OF THE INVENTION

An object of this invention is to provide an improved respiration resistance meter free from above-described difficulties.

Another object of this invention is to minimize the effect of the aspiration pressure or inspiration pressure upon the respiration resistance meter or the effect of the external load of a loudspeaker upon the source of fluid pressure.

Yet another object of this invention is to provide a new and improved respiration resistance meter of improved transient characteristic and phase characteristic.

According to one embodiment of this invention there is provided a respiration resistance meter comprising a loudspeaker for producing fluid pressure for operating a lung-chest system, a source of signal for driving said loudspeaker, an oscilloscope responsive to the flow speed and pressure of the fluid through the lung-chest system for displaying the respiration resistance thereof and means for detecting the movement of the diaphragm of the loudspeaker or the variation in the fluid pressure for providing a negative feedback to the driving means of the loudspeaker.

DESCRIPTION OF THE PREFERRED EMBODIMENT

Figure 1:
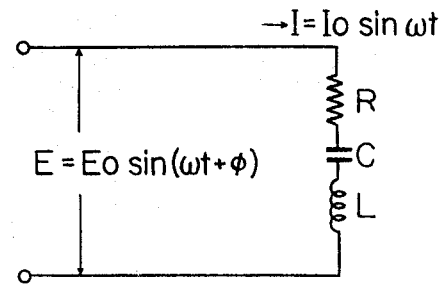
FIG. 1 shows an electrical equivalent circuit of a device for measuring the viscosity in a lung-chest system according to the oscillation method.
Figure 2:
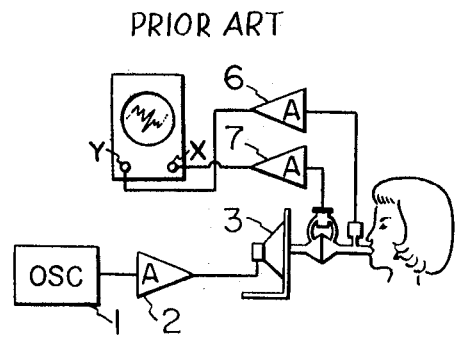
FIG. 2 shows a prior art device for measuring the viscosity resistance.
Figure 3:
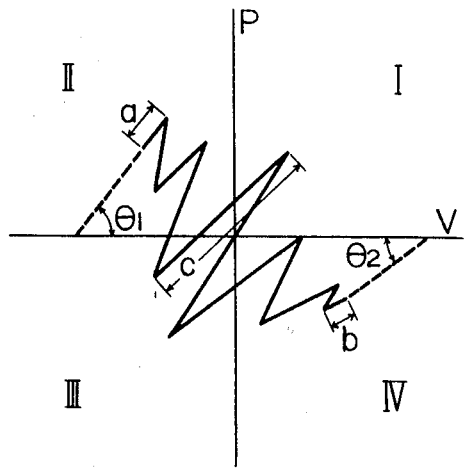
FIG 3 shows one example of a Lissajous's figure displayed by an oscilloscope.
Figure 4:
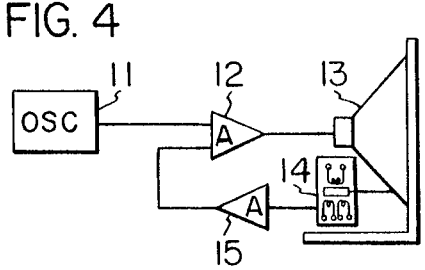
FIG. 4 is a connection diagram, partly in blocks, of one embodiment of a respiration resistance meter employing motional feedback according to this invention.

FIG. 4 of the accompanying drawing shows only component parts of a source of pressure (or a source of fluid pressure) of the apparatus, it being understood that the remainder of the apparatus is identical to that already shown in FIG. 2. The output signal from an oscillator 11 is amplified by an amplifier to drive a loudspeaker 13 of the conventional design. The apparatus shown in FIG. 4 is different from that shown in FIG. 2 in that the displacement of a paper cone diaphragm of loudspeaker 13 is detected by a transducer 14 and the detected signal is amplified by an amplifier 15 and the output thereof is negatively fed back to amplifier 12.

With this motional feedback, the displacement of the paper cone diaphragm of the loudspeaker caused by the pressure of the aspiration and inspiration is detected by transducer 14, and is then fed back to speaker amplifier 12 to cancel the displacement of the diaphragm. Therefore, the movement of the diaphragm of the loudspeaker caused by the pressure of aspiration and inspiration is negligibly small so long as the feedback is sufficiently large. However, the input signal voltage from the oscillator must be increased correspondingly to supplement the motional feedback.

Figure 5:
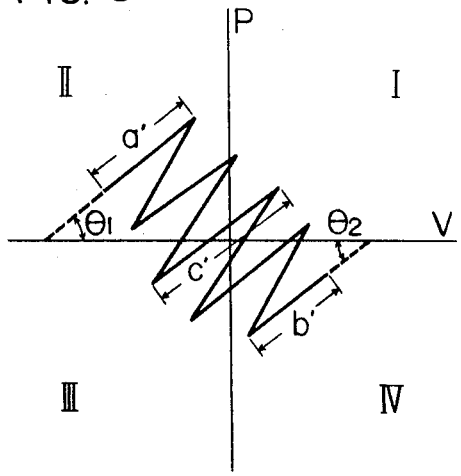
FIG. 5 is a Lissajous's figure displayed by the respiration resistance meter shown in FIG. 4.

The waveform displayed by an oscilloscope when the motional feedback is used is illustrated in FIG. 5. As can be noted from this figure, the length of straight line portions $a'$, $b'$ and $c'$ representing the variable components of the pressure and the flow speed at the maximum speed of the aspiration and inspiration becomes substantially equal so that measurement of the inclination of straight lines of the Lissajous's figure can be made very readily. thus greatly increasing the accuracy of the measurement. At the same time, the lung-chest system is caused to oscillate always with a constant pressure of flow speed during aspiration as well as inspiration so that it can act as a source of constant pressure or a source of constant flow speed.

Although in the above-described embodiment, in a respiration resistance meter utilizing a loudspeaker, the detector of the motional feedback has been shown as being responsive to the displacement of a paper cone diaphragm of a loudspeaker such negative feedback may also be provided by any parameters such as the flow speed or pressure prevailing in an air flow circuit, for example, capable of providing a similar function. Where other driving mechanism such as a pump-driven device is utilized as a source of pressure or source of fluid flow instead of a loudspeaker the above-described motional feedback system can also be used with equal results. Thus, according to this invention, the effect of aspiration pressure and inspiration pressure upon the respiration resistance meter or the effect of the external load of a loudspeaker upon a source of pressure or a source of fluid flow can be greatly reduced while at the same time the waveform of the pressure or flow quantity produced by the loudspeaker is greatly improved which results in the improvement of the transient characteristic as well as the phase characteristic. Thus, the respiration resistance meter with a motional feedback has a high practical utility.

While the invention has been described in terms of a preferred embodiment thereof, it should be understood that many changes and modifications may be made within the true scope of the invention.

What is claimed is:

1. The method of measuring the respiration resistance of a lung-chest system comprising the steps of:
   oscillating a cavity made up of a fluid pressure source coupled to a lung-chest system at approximately the resonant frequency of said cavity;
   sensing fluid flow and pressure variables in said cavity;
   indicating a functional relation between said variables representing said respiration resistance;
   sensing a quantity representative of pressure including aspiration and inspiration pressure in said cavity and
   applying said quantity degeneratively to said fluid pressure source to maintain the oscillatory component of said fluid flow and pressures variables substantially independent of said aspiration and inspiration pressure in said cavity.

2. In a respiration resistance meter for measuring the respiration resistance of a lung-chest system including a source of oscillatory fluid pressure and means adapted for coupling said source with said system to produce a resonant cavity, frequency generator means for energizing said source with a frequency range which includes the resonant frequency of said cavity, means responsive to fluid flow speed in said coupling means for producing first signal representing said speed and means responsive to fluid pressure in said coupling means for producing a second signal representing said pressure, the improvement comprising:
   indicator means responsive to said first and second signals for indicating a functional relation therebetween representative of the respiration resistance of said system;
   means for sensing variations related to respiration pressure in said coupling means and producing a signal in accordance with said variations; and
   means responsive to said signal in accordance with said variations for producing a negative feedback signal to combine with the energy from said signal generator means to compensate said source for the respiration pressure signal imposed thereon thereby to maintain the indication of said respiration resistance relatively independent of the respiration component of said fluid pressure.

3. The respiration resistance meter according to claim 2 wherein said source of fluid pressure comprises an electroacoustic transducer having a diaphragm oscillated by a signal-driven element, and said means for sensing variations related to respiration pressure comprises means for sensing the motional position of said diaphragm to produce the negative feedback signal which is combined with the energy from said signal generator means to energize said signal-driven element which oscillates said diaphragm.

4. The respiration resistance meter according to claim 2 wherein said indicator means comprises an oscilloscope with its Y axis energized by an electric quantity which is the analog of the pressure-time function in said coupling means and its X axis energized by an electric quantity which is the analog of the fluid flow speed-time function in said coupling means.